July 29, 1941.  L. J. ANDRES  2,251,026
PHONOGRAPH SELECTING SYSTEM
Filed March 25, 1940   5 Sheets-Sheet 1

INVENTOR.
Lloyd J. Andres
BY Clarence J. Loftus
ATTORNEY.

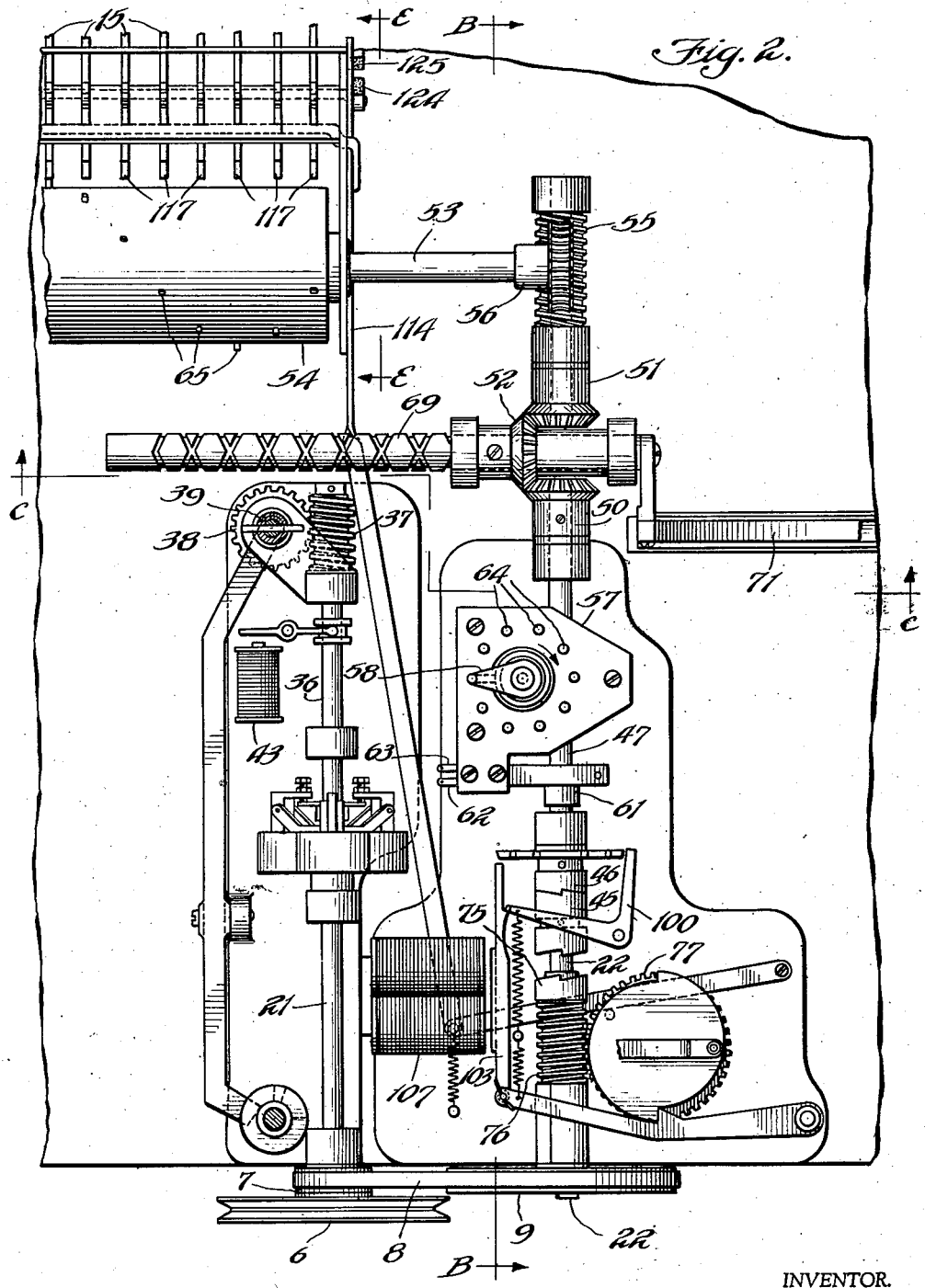

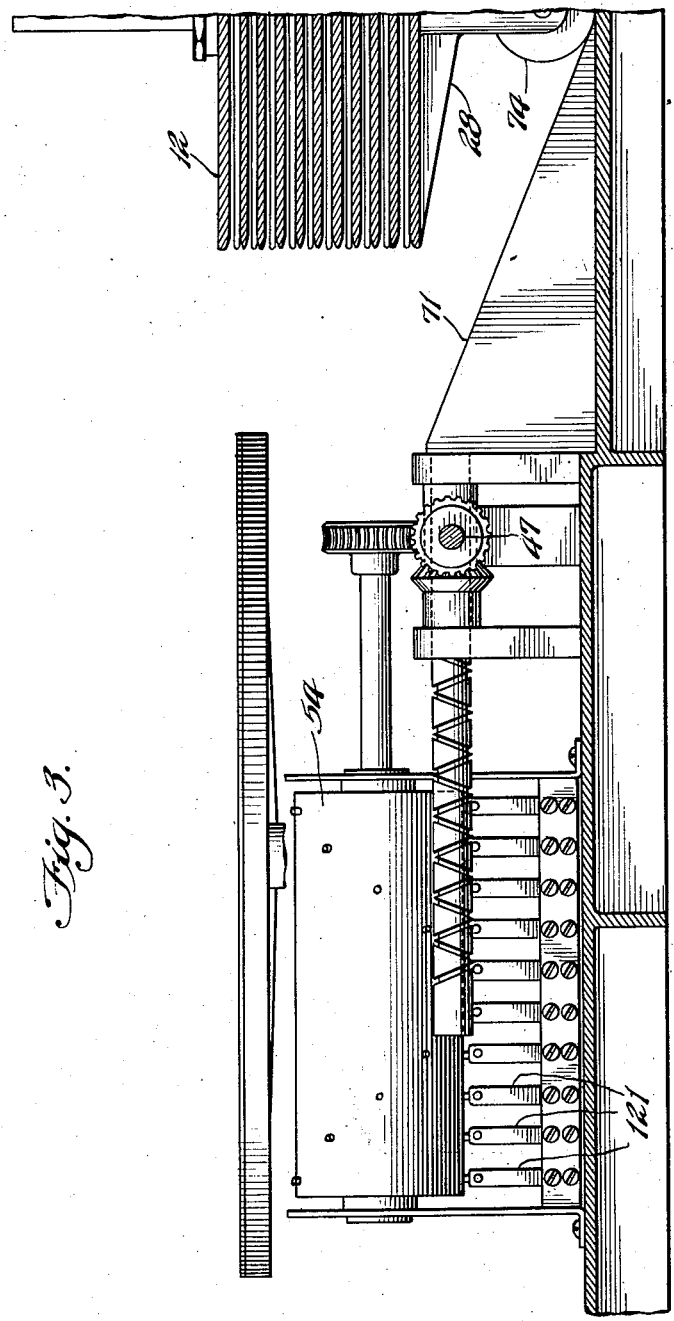

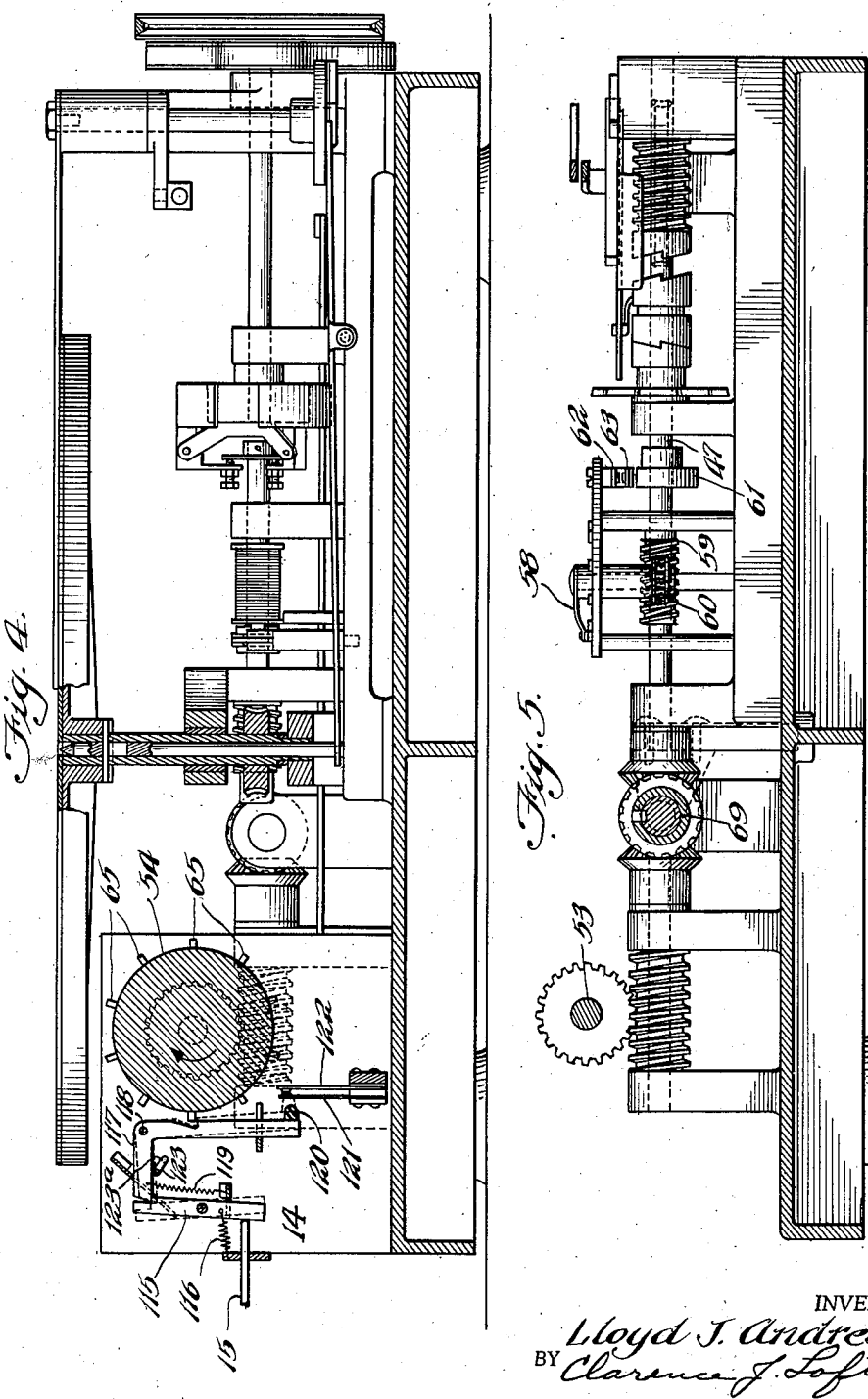

July 29, 1941.　　　L. J. ANDRES　　　2,251,026
PHONOGRAPH SELECTING SYSTEM
Filed March 25, 1940　　　5 Sheets-Sheet 5

INVENTOR.
Lloyd J. Andres
BY Clarence J. Loftus
ATTORNEY.

Patented July 29, 1941

2,251,026

UNITED STATES PATENT OFFICE 2,251,026

PHONOGRAPH SELECTING SYSTEM

Lloyd J. Andres, Chicago, Ill., assignor to Automatic Instrument Company, Grand Rapids, Mich., a corporation of Michigan Application March 25, 1940, Serial No. 325,709

4 Claims. (Cl. 274—10)

This invention relates in general to improvements in automatic phonographs and more particularly to a selecting system for automatic record changers to provide automatic plural selectivity.

This application is a continuation in part of the joint application of myself and Theodore M. Wright, Serial No. 187,500, filed January 28, 1938, for "Automatic selective record changers."

In the present invention the need for an improved selecting system is fulfilled in that, following initiation, subsequent operations of the record changer depend upon the coordination of electrical and mechanical elements which greatly simplifies the operation and eliminates the necessity for extreme precision in the manufacture thereof and inherently provides electrical means whereby the record changer is caused to perform its necessary functions by the controlled action of the combination of the mechanical elements and the electrical circuits contained therein.

A detailed description of the operation of the record changer itself will be omitted as a complete disclosure of the operation of this particular type record changer is shown in my joint application with Theodore M. Wright, "Automatic selective record changers," Serial No. 187,500, filed January 28, 1938. Thus I will limit the description of the record changer to include only those parts that are affected by my new selecting system.

The selecting system may be adapted to any particular type of record changer which includes mechanical means for transferring one of a number of records to playing position on a turntable and, subsequent to playing, returning the record to its initial position.

A principal object of the invention is the provision in an automatic selective record changer of the combination of electrical and mechanical means to provide complete automatic plural selectivity.

Another object of the invention is the means through which the selector elements in the system are self-restoring to their normal inoperative positions following the selection of a particular record in a record changer.

A further object of the invention is the means for electrically and automatically stopping and starting the record changing components in a record changer at precise pre-determined intervals during its function.

A further object of the selecting system is the means employed for initiating a plurality of pre-determined selections at substantially the same time, including means for causing the record changer to automatically and sequentially play the plurality of selected selections without further attention.

A further object of this invention is the provision of a selecting system utilizing a combination of electrical and mechanical elements cooperating to automatically select and play selected records following initiation and, subsequent to the selection of each record, to automatically restore the corresponding selector elements to their normal positions, and upon completion of the playing of all selected records, to bring the entire record changer to rest.

Referring to the drawings:

Fig. 2 is a fragmentary plan view showing the transmission parts of the record changer with the turntable, record transfer arms and pickup carriage removed.

Fig. 3 is a section taken through line c—c, Fig. 2.

Fig. 4 is a section taken through line a—a, Fig. 1.

Fig. 5 is a section taken through line B—B, Fig. 2.

Figure 1:
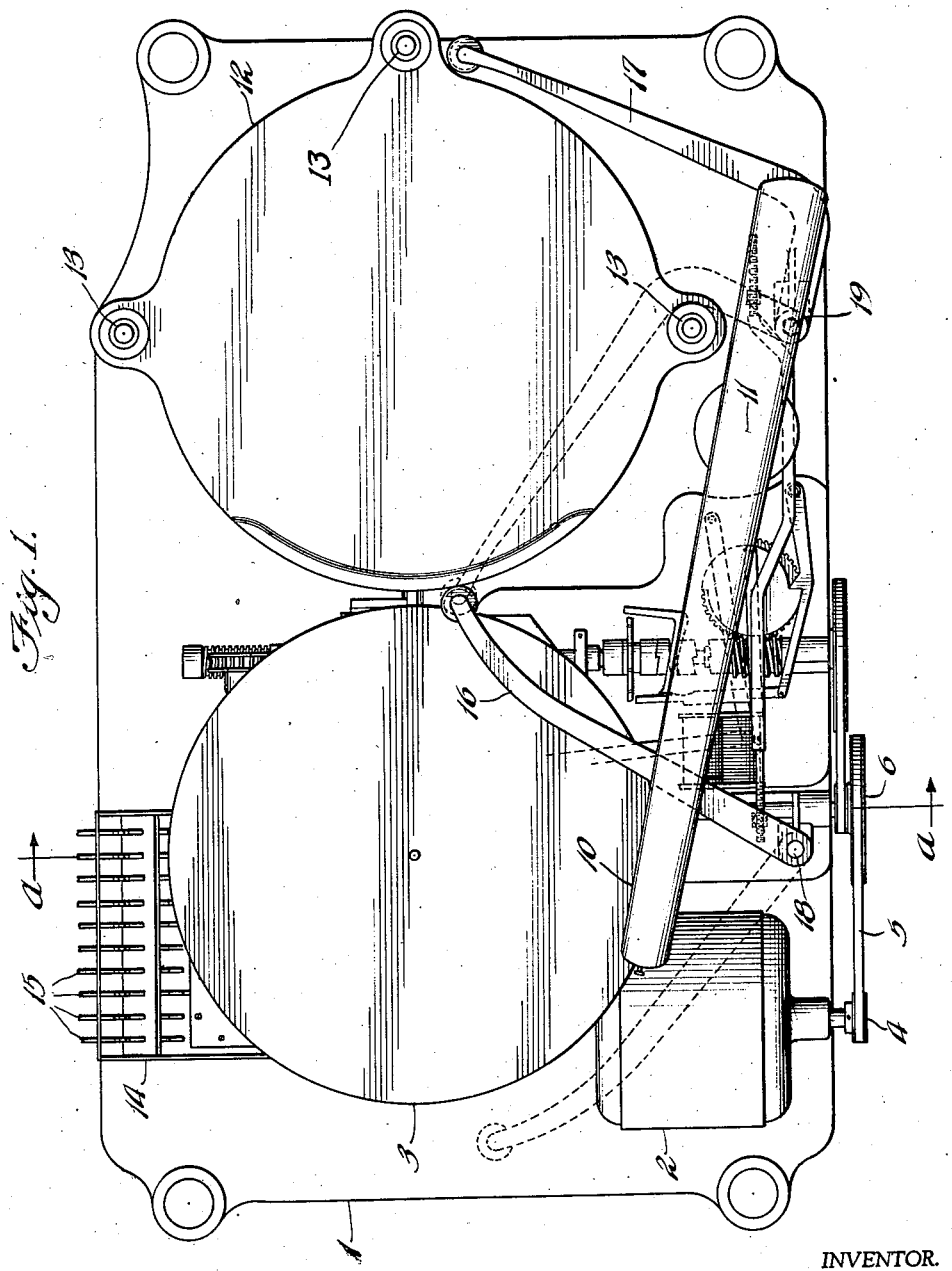
Fig. 1 is a plan view of one form of record changer incorporating the new selecting system.

Referring to Fig. 1, the principal components of the selecting system and the record changer are mounted on base 1. The electric motor 2 is adapted to drive the turntable 3 and the record changer components through pulley 4, belt 5, driven pulley 6, and also through pulley 7 through belt 8 to pulley 9. The "pickup arm" 10 is pivotally mounted at 11 and shown in its rest position. The record magazine assembly 12 is retained and guided for vertical movement by shafts 13 affixed to base 1. The selector assembly 14 contains a plurality of manually operable push rods 15.

The record shifting arms 16 and 17 are pivoted about vertical axes 18 and 19 and arranged to swing horizontally to transfer a selected record from storage position in the magazine and slide it upon the turntable for play, and conversely, upon the completion of playing, slide the record back from the turntable into its rest position on its corresponding shelf in the record magazine.

By referring to the fragmentary view shown in Fig. 2, it will be noted that motive power for operating the record changer is supplied to pulley 6, by previously described motor and belt, which transmits rotary motion through shaft 21, shaft 36 and through gears 37 and 38 to the turntable spindle 39. The magnetic clutch system shown for starting and stopping the rotation of the turntable is unimportant insofar as the selecting system is concerned. Pulley 7, integral with pulley 6, will transmit power through belt 8 and pulley 9 to shaft 22 to drive mechanism to operate the record transfer arms and pickup carriage through gears 76 and 77 through the driving action of the clutch member 45. This same clutch member 45 supplies intermittent motion through a mating clutch member 46 and shaft 47 to supply intermittent rotation to the cam 61 and the momentary switch 62 and 63. The same shaft 47 drives mechanism to supply intermittent vertical movement to the record magazine through gears 50 and 52, helical shaft 69 and the magazine raising wedge 71. Gear 52 in engagement with gear 51 supplies intermittent rotary motion to the selector drive shaft 53 through gears 55 and 56. Shaft 55 is integral with and drives the selector restoring drum 54. The commutator arm 58 of the commutator assembly 57 is driven through suitable gears from shaft 47, to be hereinafter described. The commutator arm 58, magazine raising wedge 71 and the selector restoring drum 54 will move in timed relationship when driven by clutch member 45. It is also apparent that when the clutch member 45 disengages its mating member 46 and engages with the clutch member 75, motion will be transmitted by shaft 22 to gear 77 which drives the record transfer arms and the "pickup arm" of the record changer. Electro-magnet 107 is provided to control mechanism to disengage the clutch 45 from its mating member 46 through armature 103 and bell crank 100.

Fig. 3 shows a fragmentary sectional view of the record changer showing the means employed for raising and lowering the record magazine 12 in timed relationship with the selector restoring drum 54. When rotary motion is applied to shaft 47, reciprocating movement is applied to wedge 71, and inasmuch as the magazine 12 is resting, by the action of gravity, on wedge 71 through roller 74 and support 28, it will be seen that the magazine will be raised or lowered in timed relationship with the restoring drum 54 which is geared to shaft 47.

Fig. 5 is a sectional elevation showing the shaft 47 and the gear train 59, 60 driven thereby, to drive the commutator arm 58. Cam 61 on shaft 47 is arranged to operate the momentary switch 62, 63 in timed relationship with the commutator arm 58. This view also shows the means employed for driving the reciprocating helically grooved shaft 69 and the selector restoring drum drive shaft 53, commutator arm 58 and the momentary switch cam 61 in timed relationship.

Fig. 4 shows a sectional view through the selector assembly 14 and illustrates one set of selector parts, corresponding to a particular record in the magazine, in their respective operative relationship. Manually operated push rod 15 is arranged to move selector lever 115 sufficiently far around its stationary pivot and against the restraining action of spring 116 to disengage the short arm of the selector bell crank 117, which bell crank is mounted on stationary shaft 118. The spring 119 is arranged to urge the short arm of the bell crank 117 in a downward direction. When the bell crank 117 is released from engagement with the lever 115, the insulator 120, affixed to the long arm of the bell crank, will close the electric contact springs 121, 122. Switch release crank 123, pivoted about axis 123—a, is common to all of the bell cranks 117 and is normally in its restored position shown in Fig. 4. When any bell crank 117 is released by the action of any push rod 15, the switch release crank 123 is moved in a downward direction by the short arm of the bell crank 117. The resultant action of the movement of the crank 123 will be hereinafter described. As previously mentioned, the long arm of the bell crank 117 will close its corresponding electric contact springs 121, 122. Each bell crank 117 is arranged in the path of one of the studs 65 which are mounted to the selector restoring drum 54 in helical fashion, as shown in Fig. 2. The number of helically arranged studs on drum 54 correspond to the number of bell cranks 117.

Figure 6:
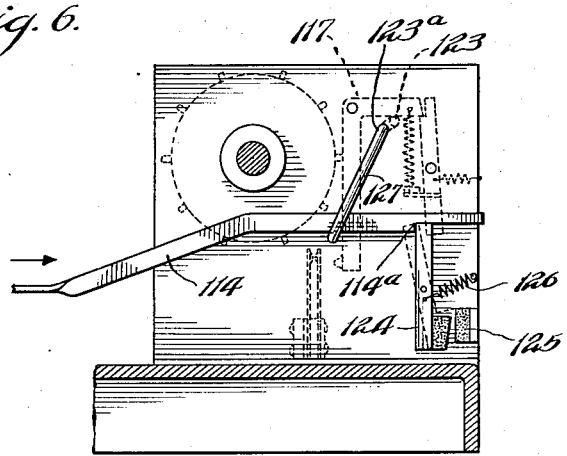
Fig. 6 is a sectional view of the selector assembly taken through line e—e, Fig. 2.

Fig. 6 shows the record changer motor switch 124, 125 normally urged toward its closed position by spring 126. When the record changer is in its rest position the switch arm 124 is engaged with abutment 114—a on the restoring lever 114. Integral with crank 123 is the elongated auxiliary crank arm 127, a projection of which is in operative contact with the lower edge of the lever 114. Lever 114 is arranged to be mechanically reciprocated by the record changer at the completion of every cycle of play of the record changer in the direction shown by arrow in Fig. 6. It is obvious that when all bell cranks 117 are restored the arm 127 will permit the abutment 114—a of the lever 114 to engage with switch arm 124 and open the switch 124, 125 when the lever 114 is moved to a position shown in Fig. 6.

It is apparent when the crank 123 is moved downwardly by the action of any one of the bell cranks 117, the projection on the end of the auxiliary crank arm 127 will move upward and release the engagement between the master switch arm 124 and the abutment on lever 114 Thus, the switch 124, 125 will close by the action of spring 126 and start the record changer motor 2.

Figure 7:
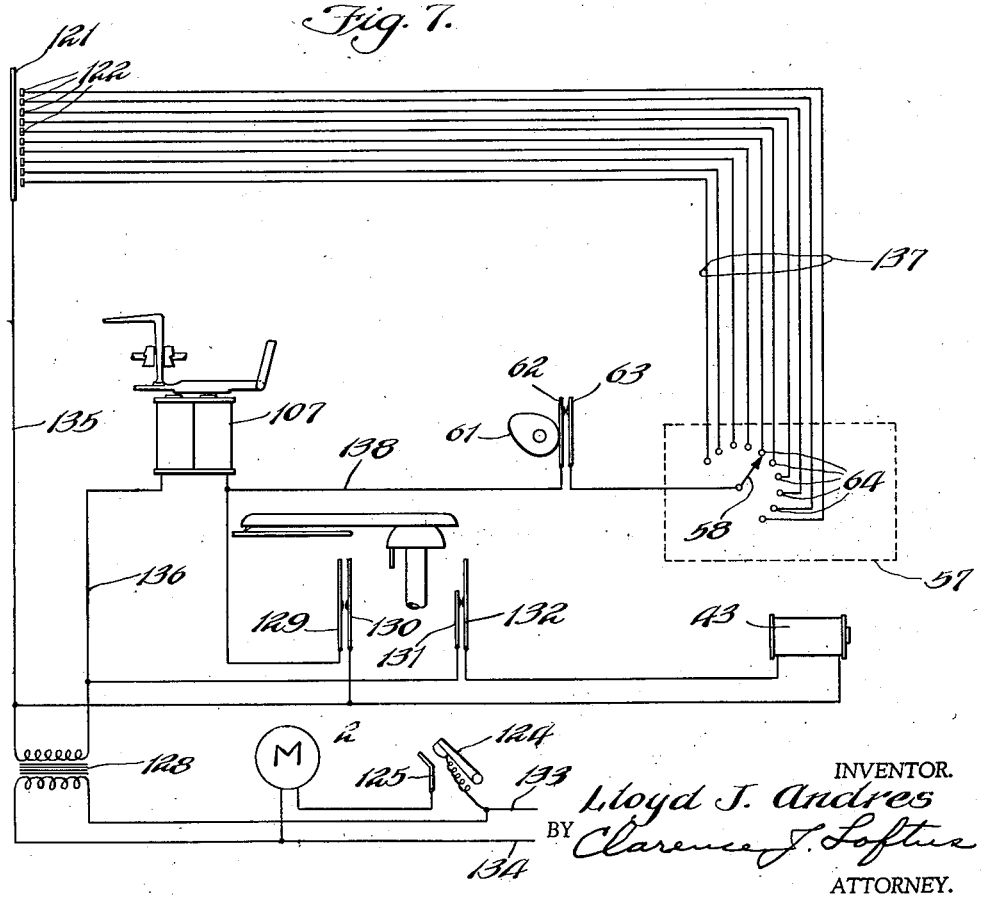
Fig. 7 is a schematic wiring diagram employed in the selecting system and a diagrammatic showing of the mechanical elements affected thereby.

The electrical components of the selecting system are connected as shown in the schematic wiring diagram, Fig. 7. Electric power is supplied to the step-down transformer 128 from the power lines 133, 134 to the record changer motor 2 through switch 124, 125. One side of the secondary of the transformer 128 is connected to the "common" selector switch contact springs 121 by conductor 135, which conductor also connects to one side of the "pickup arm" actuated "cut-off" switch 130 and the turntable control magnet 43. As previously mentioned, the operation of magnet 43 is unimportant insofar as the selecting system is concerned. The opposite secondary terminal of the transformer 128 connects with one side of the clutch electromagnet 107 through conductor 136, and also connects the remaining side of the turntable control magnet 43 through switch 131—132. The selector electric contact springs 122 are connected to corresponding commutator contacts 64 by conductors 137. Conductor 136 completes a circuit to magnet 107 through normally open pickup "cut-off" switch 129, 130. The same circuit through magnet 107 is completed through conductor 138 through the momentary switch contacts 62, 63 to the contact arm 58 of the commutator 57. The normally open pickup "cut-off" switch 129, 130 is closed by the action of the "pickup arm" after the completion of the playing of every record. The normally closed turntable magnet switch 131—132 is opened by the pickup carriage when the carriage is in rest position, which automatically stops the turntable from rotating during the transfer of a record.

The operation of the selecting system will be described by steps corresponding with the various cycles of operation of the record charger such as the selecting cycle, the forward transfer cycle, the playing cycle, and the return transfer cycle.

Assuming the record changer is at rest, the record changer motor switch 124, 125, Fig. 6, will be in its open position and the motor driven clutch member 45 will be in engagement with its mating member 46 and thus will be in a position to drive the shaft 47, the commutator arm 58, the magazine 12, (Fig. 3), and the selector restoring drum 54. The turntable magnet control switch 131—132 will be held in its open position by the tone arm 10 because it is in its rest position. All of the bell cranks 117, Fig. 4, will be in their restored positions, shown by full lines, and the corresponding switch springs 121, 122 will be in their open circuit positions.

Selective cycle

Under the assumption that one of the push rods 15, Fig. 4, is manually pushed, the lever 115 will release bell crank 117 and the insulated projection on the lower end thereof will close the corresponding electric contact springs 121, 122 by the action of spring 119. Simultaneously, crank 123 will rotate about its axis 123—a and cause the lower projection of the auxiliary arm 127, Fig. 6, to raise lever 114 until the abutment 114—a of the lever 114 disengages the switch arm 124. This movement will permit the switch 124, 125 to close and start the driving motor, shown in Fig. 1, and in the circuit diagram, Fig. 7. Since the clutch members 45, 46, shown in Fig. 2, are in engagement, the commutator arm 58 and the restoring drum 54 will start their respective rotary movement in timed relationship with the vertical movement of the record magazine 12, and since the electric contact springs 121, 122, corresponding with the initiated push rod 15, are closed, a corresponding contact of the commutator 57 will be energized.

The magazine, restoring drum and commutator 58 will continue their timed relative movement unit the commutator arm establishes electrical connection to the aforesaid energized commutator contact 64, then, through the predetermined timed action of cam 61 and the momentary switch 62, 63, the momentary switch is caused to close.

At this point the record magazine will have moved to a position where the pre-determined record, corresponding with push rod 15, will be adjacent to the upper surface of the turntable and further movement will be stopped by virtue of a circuit completed through the clutch electromagnet 107, shown in Fig. 2 and Fig. 7, causing the clutch member 45 to disengage from member 46 and engage with clutch member 75 which drives the record transfer mechanism and controls the operation of the tone arm. It is apparent that the commutator arm 58 and the selector restoring drum 54 will also stop simultaneously with the magazine. Just prior to the stopping of the restoring drum 54, a stud 65, corresponding with a bell crank 117, will have engaged the long arm of the bell crank to move it to its normal latched position in engagement with lever 115, which action simultaneously opens the selector contact springs 121, 122. Thus the selecting cycle is completed.

The forward transfer cycle

Immediately following the above operation, the record transfer arms 16 and 17, shown in Fig. 1, will transfer the selected record from the magazine to the turntable and the arm 10 will lower to engage its stylus with the starting grooves of the record. At this point, the clutch member 45 will disengage from its mating member 75 and remain in neutral position, and the turntable will rotate the record placed thereon by the action of the magnet 43 of the turntable clutch, shown in Figs. 2 and 7, engaging shaft 36 and 21, shown in Fig. 2, the turntable control switch 131—132 having been closed by the downward movement of the "pickup arm." Thus the forward transfer cycle is completed.

The playing cycle

When the "pickup arm" engages the starting groove of the selected record the playing cycle will start and the turntable and the record thereon will continue rotation until the stylus of the "pickup arm" reaches the terminating grooves in the record. At this point the "cut-off" switch 129, 130 will be closed by the action of the "pickup arm" and the playing cycle is completed.

Return transfer cycle

When the "cut-off" switch 129, 130 is actuated by the tone arm at the completion of play of a record, a circuit will be completed through the clutch electro-magnet 107, as shown in Fig. 7, and the clutch member 45, having remained in neutral during the playing cycle, will reengage with its mating member 75. The "pickup arm" will first be returned to its normal rest position by the action of mechanism not shown, and immediately following, the played record will be transferred from the turntable to its original position in the magazine by the reverse action of the record transfer arms 16 and 17, shown in Fig. 1. At this point the clutch member 45, shown in Fig. 2, will be mechanically moved out of engagement with mating member 75 and into re-engagement with its mating member 46, and simultaneously with this movement, the lever 114, Fig. 2, and Fig. 6, will be moved in the direction shown by arrow in Fig. 6 to open the record changer motor switch 124, 125 to stop the driving motor 2 of the record changer, completing the return transfer cycle. The mechanism is now at rest with all its components in rest position as previously described.

In the event that several push rods 15 are pushed substantially at the same time, the above cycles of operation will be completed once for each record selected and the mechanism will operate continuously until all the records corresponding with the depressed push rods 15 have been played and returned to their respective positions in the record magazine.

Referring to Fig. 6, it is apparent that so long as any bell cranks 117 are in their tripped positions, the crank 123 will remain in its downward position. Its auxiliary arm 127, actuated thereby, will prevent the reciprocating action of lever 114 from engaging the switch arm 124, thus the record changer motor 2 will continue its operation until all selected records are played.

Having described my invention, I claim:

1. In an automatic phonograph, a turntable, a tone arm, motor-driven means for selectively presenting the records in playing position with the tone arm, and electrically-controlled means for said motor-driven means comprising a plurality of selector rods corresponding in number to the records, an electric circuit including a corresponding number of switches, means companion to said selector rods and actuated thereby for closing the respective switches when the rods are selected to govern said motor-driven means and play the records selected, and means common to said selector rod companion means and selectively registrable at a pre-determined time with a given previously actuated companion means to move it in a direction to open its respective switch.

2. A selecting system for an automatic record changer, comprising a plurality of manually initiated elements cooperatively related with a plurality of corresponding normally open electric switches, a motor driven commutator having a plurality of electric contacts corresponding in number and sequence with said switches, said commutator having a motor driven brush adapted to successively contact each of said commutator contacts, a motor driven restoring device for successively restoring said switches to their normal open positions, an electro-magnetic clutch adapted to stop and start the movement of said commutator brush and restoring device in timed relation, an electric circuit between said switches and commutator for energizing any contact of said commutator upon the closing of any corresponding one of said switches by one or more of said manually initiated elements, a further electric circuit between the commutator brush and the said electro-magnetic clutch, adapted to momentarily energize the said magnetic clutch upon contact of the brush with any previously energized commutator contact.

3. A selecting system for an automatic record changer, comprising a plurality of manually releasable latches cooperatively related with a plurality of corresponding normally open electric switches, a motor driven commutator having a plurality of electric contacts corresponding in number and sequence with said switches, said commutator having a motor driven brush adapted to successively contact each of said commutator contacts, a motor driven restoring device for successively restoring said switches to their normal open positions, an electro-magnetic clutch adapted to stop and start the movement of said commutator brush and restoring device in timed relation, an electric circuit between said switches and commutator for energizing any contact of said commutator upon the closing of any corresponding one of said switches by one or more of said manually releasable latches, a further electric circuit between the commutator brush and the said electro-magnetic clutch, adapted to disengage the clutch upon contact of the brush with any previously energized commutator contact.

4. A selecting system for an automatic record changer, comprising a plurality of manually releasable latches cooperatively related with a plurality of corresponding normally open electric switches, a motor driven commutator having a plurality of electric contacts corresponding in number and sequence with said switches, said commutator having a motor driven brush adapted to successively contact each of said commutator contacts, a motor driven restoring device for successively restoring said switches to their normal open positions, an electro-magnetic clutch adapted to stop and start the movement of said commutator brush and restoring device in timed relation, an electric circuit between said switches and commutator for energizing any contact of said commutator upon the closing of any corresponding one of said switches by one or more of said manually releasable latches, a further electric circuit between the commutator brush and the said electro-magnetic clutch, adapted to disengage the clutch upon contact of the brush with any previously energized commutator contact, a motor driven switch for momentarily completing said further electric circuit at a pre-determined time when said brush is in engagement with an energized contact.

LLOYD J. ANDRES.